United States Patent
Fortsch

[11] 3,875,619
[45] Apr. 8, 1975

[54] ADJUSTABLE CLIP
[75] Inventor: William A. Fortsch, Livingston, N.J.
[73] Assignee: Thomas & Betts Corporation, Elizabeth, N.J.
[22] Filed: Apr. 8, 1974
[21] Appl. No.: 458,854

[52] U.S. Cl. ............................ 24/16 PB; 24/249 SL
[51] Int. Cl. .............................................. B65d 67/02
[58] Field of Search.......... 24/16 PB, 17 PB, 30.5 P, 24/30.5 R, 30.5 W, 73 RB, 73 AP, 73 SA, 206 A, 255 AS, 255 BC, 243 H, 243 AC, 248 R, 248 CR, 248 SL, 248 HC, 249 R, 249 SL, 270, 271; 16/DIG. 13; 248/74 PB, 74 A, 74 B

[56] References Cited
UNITED STATES PATENTS

| | | | |
|---|---|---|---|
| 588,848 | 8/1897 | Wightman | 24/30.5 R |
| 2,421,443 | 6/1947 | Torresen | 248/74 B |
| 3,061,263 | 10/1962 | Butler | 24/248 CR |
| 3,181,217 | 5/1965 | Bohlinger et al. | 24/216 A |
| 3,339,246 | 9/1967 | Geisinger | 24/16 PB |
| 3,698,681 | 10/1972 | Lacey | 24/248 SL |
| 3,731,347 | 5/1973 | Caveney et al. | 24/16 PB |

FOREIGN PATENTS OR APPLICATIONS

| | | | |
|---|---|---|---|
| 1,056,999 | 2/1967 | United Kingdom | 16/DIG. 13 |

Primary Examiner—Paul R. Gilliam
Assistant Examiner—Kenneth J. Dorner
Attorney, Agent, or Firm—David Teschner; Jesse Woldman

[57] ABSTRACT

A one piece adjustable plastic clip comprises first and second rigid leg members joined together by means of a resilient connecting portion integral with the leg members, and a serrated tail member fixedly coupled to one of the leg members and so positioned with respect to a toothed aperture in a head portion disposed adjacent the free end of the other leg member wherein upon closure of the leg members the tail member is directed into the head portion aperture, the tail member serrations and head portion aperture selectively coacting to provide adjustable interlocking engagement therebetween for restraining one or more elongate articles such as a wire bundle or the like between said leg members. Each of the leg members may further be provided with selectively formed gusset portions each having a preferably arcuately formed free edge at least partially framing a selectively shaped opening between said leg members. Release means may be provided to permit the tail member to be readily disengaged from the head portion aperture. Flanges bordering the tail member serrations may be provided with teeth serving as a gripping portion thereat.

10 Claims, 10 Drawing Figures

ADJUSTABLE CLIP

BACKGROUND OF THE INVENTION

1. Field of the Invention

The invention is directed to the field of article retaining devices and principally to an improved adjustable clip.

2. Description of the Prior Art

Prior art devices adapted for securing one or more elongate articles together or to a support member have been in common use especially in the electrical industry in the form of harness aids and the like. Such devices generally comprised a resilient strap-like body and tail portion designed to fit within or be attached to an apertured or slotted head portion to form a complete loop about, for example, a bundle of wires or the like. Most devices of this type generally require the user to manually guide and direct the tail portion of the strap to insure engagement with the opposing head portion, which operation often requires the use of both hands of the user to complete the assembly. In many applications, the area available for such manipulation is often both relatively inaccessible and restricted, resulting in an inconvenient, time-consuming, and laborious operation. Improvements over such former devices generally comprised a clip manually manipulable with a single hand as exemplified, for example, in U.S. Pat. No. 3,670,369, issued June 20, 1972, to McElroy, II, and U.S. Pat. No. 3,571,861, issued Mar. 23, 1971 to Alson. The McElroy device, although manipulable with a single hand, nevertheless requires the user to manually guide the resilient tail member towards the latching head to effect interengagement therebetween. The Alson device, exemplary of many others of such type, fails to have a provision for adjusting the opening formed between the closed leg members to accommodate articles of various sizes. Accordingly, these latter devices, although representing an advancement over such former prior art devices, still fail to provide the necessary ease, convenience, and versatility of assembly required to overcome the shortcomings of the former prior art devices.

SUMMARY OF THE INVENTION

The invention overcomes the limitations and restrictions noted above with respect to prior art devices by providing a molded one piece self-aligning adjustable plastic clip which is simpler, more convenient, and more versatile than such prior art devices. A rigid serrated tail member is fixedly attached to one end of a pair of rigid leg members coupled together by a resilient connecting portion having a reduced cross section operating as a hinge portion, the free end of the other leg member of the pair comprising a head portion having an aperture therethrough adapted to adjustably receive the tail member thereon upon closure of the legs. The tail member is positioned in relation to the hinge point of the clip and selectively formed so that upon closure of the leg members the tail member is directed in a predetermined arcuate path towards and into the aperture in the head portion, and is interlockingly engaged therewithin by coacting engagement between complimentary serrations of teeth both on the tail member and within the head member aperture. In one embodiment the locking means in the head portion aperture comprises an integral flexible tongue member having serrations selectively positioned along one of the surfaces thereof, which serrations are arranged to engage and interlock with the tail member serrations. The flexible tongue member may be further provided with an extension thereon extending beyond the confines of the head portion whereby the tongue member may be deflected away from the tail member to release the tail member from engagement within the head portion aperture. Each of the pair of leg members may be provided with a gusset having a preferably arcuately formed free edge so that, upon closure of the leg members, the free edge of the gussets may at least partially define an arcuate orifice having a predetermined shape approximating the shape of the elongage members to be enclosed within the clip. It is therefore an object of this invention to provide an improved adjustable clip.

It is another object of this invention to provide a molded, one piece, self-aligning adjustable clip.

It is a further object of this invention to provide a molded, one piece, self-aligning adjustable plastic clip for retaining one or more elongate articles between the leg members thereof.

It is still a further object of this invention to provide a selectively adjustable one piece self-aligning plastic clip having a predetermined article receiving orifice at least partially defined by the inner surfaces of a pair of gusseted leg members.

It is yet another object of this invention to provide a one piece self-aligning adjustable plastic clip having releasable locking means in a head portion thereof.

It is yet a further object of this invention to provide a one piece molded self-aligning adjustable plastic clip in which a reduced cross-sectional area is employed to provide a hinge like connection at the juncture between a pair of rigid leg members.

Other objects and features will be pointed out in the following description and claims and illustrated in the accompanying drawings which disclose, by way of example, the principle of the invention and the best modes contemplated for carrying it out.

BRIEF DESCRIPTION OF THE DRAWINGS

In the Drawings.

Similar elements are given similar reference characters in each of the respective drawings.

DESCRIPTION OF THE PREFERRED EMBODIMENTS

Figure 1:
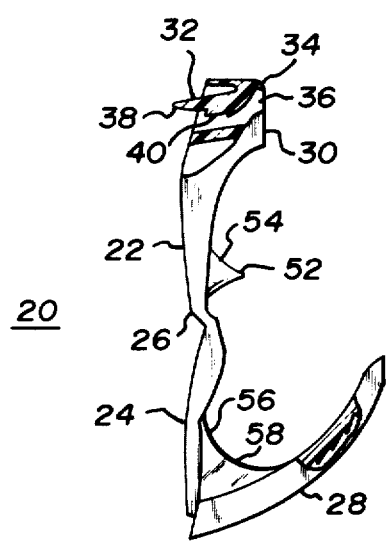
FIG. 1 is a side elevational view, partly cut away and partly in section, showing an adjustable clip constructed in accordance with the concepts of the invention.
Figure 2:
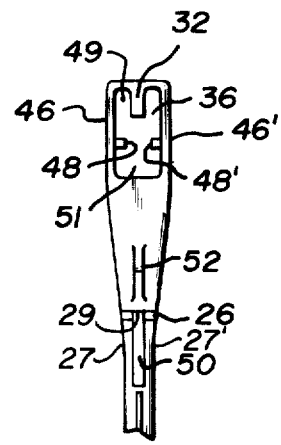
FIG. 2 is a fragmentary front elevational view showing the head portion and a part of a first leg member of the device of FIG. 1.
Figure 3:
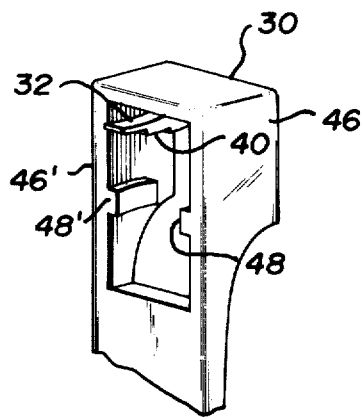
FIG. 3 is a fragmentary perspective view of the head portion of the device of FIG. 1.
Figure 4:
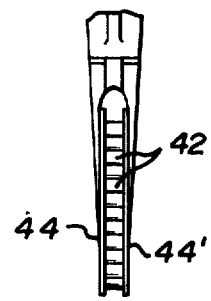
FIG. 4 is a fragmentary front elevational view of the tail member of the device of FIG. 1.
Figure 5:
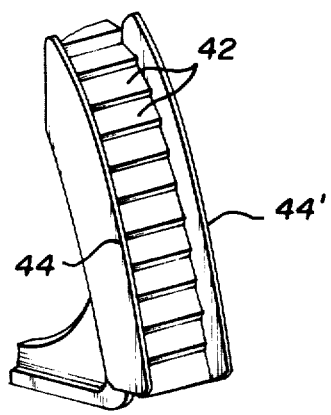
FIG. 5 is a fragmentary perspective view of the tail member of the device of FIG. 1.
Figure 6:
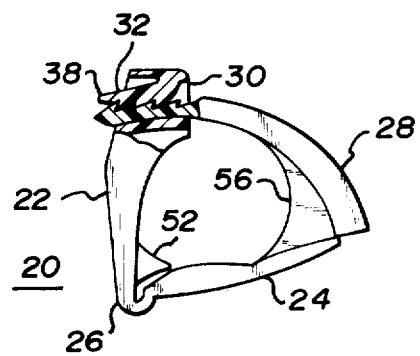
FIG. 6 is a side elevational view, partly cut away and partly in section, showing the device of FIG. 1 in a partially closed state.
Figure 7:
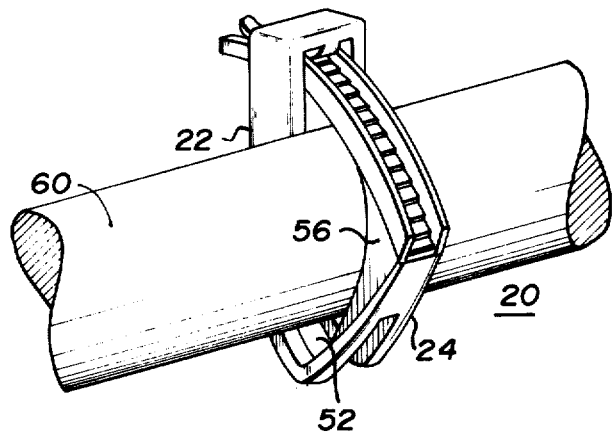
FIG. 7 is a perspective view of the device of FIG. 1 as employed to retain an elongate article therewithin.
Figure 8:
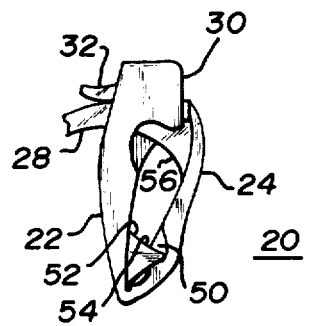
FIG. 8 is a partially cut away side elevational view, showing the device of FIG. 1 in a fully closed state.

Referring now to FIGS. 1 through 8, there is shown an adjustable clip 20 constructed in accordance with the concepts of the invention. Clip 20 may be readily manufactured from almost any one of a variety of thermoplastic materials which may include, but are not limited to nylon, Delrin, polyethylene, polypropylene, flexible PVC, and other similar readily molded materials. Clip 20 comprises an integrally molded part having a first leg member 22 and a second leg member 24 attached to one another by a resilient connecting portion 26. As seen in greater detail in FIGS. 1 and 2, the portion 26 of clip 20 comprises a reduced cross-sectional area arranged to provide flexibility about a preferred axis so that a hinge-like connection is produced thereat. As may be more readily described in FIG. 2, the connecting portion 26 is formed adjacent one end of a pair of spaced struts 27, 27' separated by an opening 29 therebetween. Rigidly affixed to the second leg member 24 is a tail member 28 which, although shown as extending from the second leg member 24 at a generally acute angle therewith, may be angularly disposed with respect to the second leg member 24 either generally perpendicular thereto or at some obtuse angle depending upon the opening desired and the arc to be described by the tail member 28. The free end of first leg member 22, opposite its juncture with the second leg member 24 is provided with a head portion 30 having a deflectable tongue member 32 extending selectively therewithin and attached to an upper wall 34 of head portion 30. Extending transversely through head portion 30 is an aperture 36 adapted to receive the tail member 28. As further illustrated in FIG. 1, the tongue member 32 further comprises a free end 38 which protrudes beyond the confines of the head portion 30 and which may be employed to manipulate the tongue member 32 in order to release the tail member 28 from engagement within the head portion 30, in a manner which will be described in more detail hereafter. It should be understood, however, that the flexible tongue 32 may be foreshortened so that it is enclosed entirely within head portion 30 where, for example, the releasable feature is neither necessary nor desirable. The tongue member 32 is further provided with one or more serrations 40 to provide interlocking engagement with a series of serrations 42 extending along the length of tail member 28 and formed to interlock with the serrations 40 of the tongue member 32, as may be seen in greater detail in FIG. 6. Although the serrations 42 shown in FIGS. 4 and 5 extend essentially along the entire length of tail member 28, they may be confined to selective portions thereof where it is desired, for example, to control the degree of closure between the first and second leg members 22 and 24, respectively. For example, by eliminating one or more of the serrations 42 in the area generally adjacent the juncture between the tail member 28 and the second leg member 24, full closure of such leg members will thereby be limited so that interengagement between the tail member 28 and the tongue member 32 will be confined to only that portion of the tail member including such serrations 42. In this manner the minimum opening defined by the first and second leg members 22 and 24, respectively, upon their closure, may be readily and conveniently controlled. The maximum opening which may be attained with clip 20 may be controlled in a similar manner by eliminating one or more of the serrations 42 in the area generally adjacent the free end of tail member 28. Bordering the tail member serrations 42 are a pair of flanges 44, 44', providing at least a partial protective-like enclosure thereabout. Thus, to effect closure of the first and second leg members 22 and 24, respectively, the finger of the user may be placed upon the flanges 44, 44' and on the first leg member 22 generally adjacent the head portion 30, and the clip 20 folded about the resilient connecting portion 26 in a single, rapid and convenient manipulation. Since both the first and second leg members 22 and 24, respectively, and the tail member 28 are rigidly formed, the tail member 28 will describe an arc about the weakened portion 26 as it approaches the head portion 30. The aperture 36 in the head portion 30 is selectively positioned with respect to portion 26 of clip 20 so that the free end of tail member 28 will directly enter the aperture 36 upon closure of clip 20. It will of course be readily apparent to those skilled in the art that the aperture 36 may be arcuately contoured in its longitudinal direction to correspond generally with the arc described by the tail member 28 upon closure of the leg members 22 and 24, where it is desired to maintain a relatively close fit between the aperture 36 and the outer contour of the tail member 28. Extending inwardly within aperture 36 from a pair of spaced side walls 46, 46' defining the sides of aperture 36 are a pair of elongate support rails 48, 48' (FIGS. 2, 4) dividing aperture 36 into an upper and lower portion 49, 51, respectively. The support rails 48, 48' serve to support the tail member 28 within the upper portion 49 against the influence of the force exerted by the tongue member 32 thereagainst in the locked position. The lower portion 51 of aperture 36 is arranged to provide a relief for a portion of clip 20, as will be described in more detail hereafter. Support rails 48, 48' may be arcuately formed to correspond to the curve of the adjacent surface of tail member 28 to provide increased contact therebetween upon closure of the clip 20. The support rails 48, 48' also serve to prevent the tail member 28 from being deflected away from the tongue member 32 and unintentionally disengaged therefrom where the tongue member 32 has not been manipulated to its release position to effect the intentional release of the tail member 38. The second leg member 24 is further provided with an opening 50 (FIG. 2) communicating with the opening 29 and extending a predetermined distance from the weakened portion 26 of clip 20 along the length of the second leg member 24. Although opening 50 is shown as extending transversely through the second leg member 24, this arrangement may be modified wherein there is provided merely a recessed portion (not shown) extending only partially through the second leg member 24. The purpose of opening 50 may be more readily appreciated by reference now to FIG. 8, which illustrates the clip 20 in its fully closed position. As shown, the opening 50 serves as a receiving pocket or chamber for a gusset portion 52 which protrudes outwardly from the first leg member 22 generally adjacent the weakened portion 26 of clip 20. Gusset portion 52 comprises an outer edge 54 which is shown as arcuately formed and extending generally contiguously from the adjacent surface of first leg member 22 to provide a smooth transition across the hinged portion 26 upon closure of the clip 20 to prevent an article contained within the clip from being wedged or pinched in the juncture between the first and second leg members 22 and 24, respectively, upon closure of the clip 20. The outer edge 54 of gusset portion 52 forms part of the perimeter of the article receiving opening formed by closure of the first and second leg members 22 and 24, and thus provides a more smoothly contoured opening thereat. Extending between the inner surfaces of the second leg member 24 and the tail member 28 adjacent the juncture therebetween is a second gusset portion 56 having a free edge 58 (FIG. 1). Gusset portion 56 serves both as a stiffening member between the second leg member 24 and the tail member 28, and as a means for further providing a smoothly contoured arcuate portion of the perimeter of the aforesaid article receiving opening formed by the closure of the first and second leg members 22, 24, respectively. Although not shown in the illustrations, the free edges 54 and 58 of gusset portions 52 and 56, respectively, or either one alone, may be provided with serrations, indentations, or other suitable configurations, to further modify the contour of the article receiving opening to adapt the clip 20 for engagement about specially contoured elongate articles which may have, for example, a square, rectangular, or polygonal cross section. As shown more clearly in FIG. 7 upon closure of the clip 20, about an elongate member such as cable 60, the gusset portions 52 and 56 coact to tightly encircle the cable 60 and maintain it in position generally centrally within the article receiving opening formed by the closure of leg members 22 and 24. The second gusset portion 56, which is essentially a relatively thin web-like member situated generally centrally of the width of both the tail member 28 and the second leg member 24, is arranged to enter and fit within the lower portion 51 of aperture 36 in the head portion 30, just beneath the support rails 48, 48', as shown in the cut-away view in FIG. 8. This arrangement permits a much tighter closure of the leg members 22 and 24 than would be possible otherwise, thereby appreciably increasing the range of openings to which clip 20 may be adjusted. The release of the tail member 28 from locking engagment with the flexible tongue member 32 may be accomplished simply by manipulating the extending portion 38 of the tongue member 32 in a direction away from the tail member 28 sufficiently to disengage the interlocked serrations 40 and 42 on the flexible tongue 32 and the tail member 28, respectively.

Figure 9:
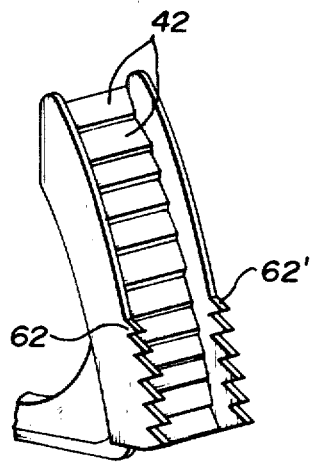
FIG. 9 is a fragmentary perspective view of a further embodiment of the tail portion of an adjustable clip constructed in accordance with the concepts of the invention.
Figure 10:
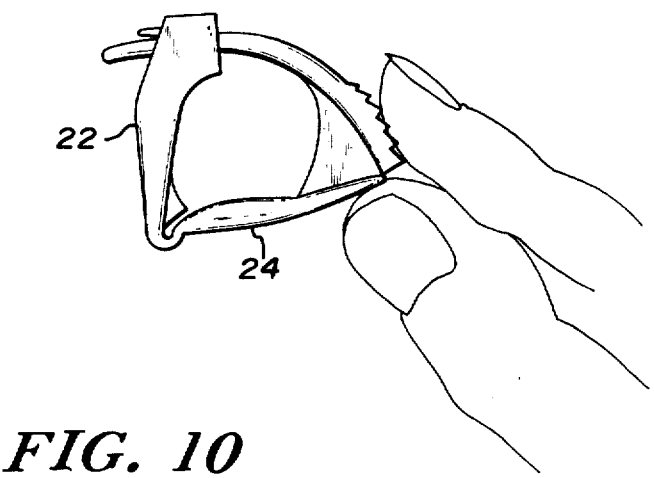
FIG. 10 is a side elevational view, showing employment of the gripping feature of the embodiment illustrated in FIG. 9.

Turning now to FIGS. 9 and 10, each of the tail member flanges 44, 44' may be provided with notched portions or teeth 62, 62' extending selectively along the free edge of the flanges permitting the user to more conveniently grasp and manipulate the tail member 28 into engagement with the head portion 30 of clip 20. The teeth 62, 62' may extend selectively either along a limited portion of each of the flanges 44, 44', substantially as illustrated in FIGS. 9 and 10, or may extend along the entire length thereof, as necessary or desirable.

The embodiments of the invention in which an exclusive property or privilege is claimed are defined as follows:

1. A one-piece adjustable plastic clip comprising: a first rigid leg member having a first end and a second end; a second rigid leg member having a first end and a second end; said first end of each of said first and said second leg members being hingedly joined together by a resilient connecting portion of reduced crosssection integral with said first and said second leg members; a head portion disposed adjacent said first leg member second end, said head portion having an aperture extending therethrough generally perpendicular to the longitudinal axis of said first leg member, said head portion further comprising a pair of spaced rails extending axially within said head portion aperture to divide said head portion aperture into an upper portion and a lower portion, said tail member being guided and supported on said rails within said upper portion of said head portion upon its entry into said head portion aperture; and a rigid tail member extending fixedly from said second leg member second end at a predetermined angle with respect thereto and selectively located with respect to said resilient connecting portion so that said tail member is caused to traverse a predetermined arc generally including said head portion aperture upon the selective closure of said first and said second leg members; said tail member further having a plurality of serrations in selectively spaced arrangement extending along at least a portion of the length thereof, said first leg member head portion aperture upper portion including means cooperatively engageable with said tail member serrations to provide interlocking engagement therebetween upon the selective closure of said first and said second leg members; said first leg member further comprising a first gusset portion extending outwardly therefrom generally adjacent said first end thereof, said clip further comprising a second gusset portion extending between said second leg member and said tail member generally adjacent the juncture therebetween, said first gusset portion and said second gusset portion each having an arcuately shaped free edge, said free edges being disposed in selective relation to one another so that upon selective closure of said first and said second leg members, said free edges at least partially define a generally arcuately formed perimeter of an article receiving opening therebetween.

2. An adjustable clip as defined in claim 1 wherein said resilient connecting portion comprises a pair of spaced struts having an opening therebetween.

3. An adjustable clip as defined in claim 1 wherein said second leg member has a recessed portion generally adjacent said first end thereof, said first gusset portion being aligned with said second leg member recessed portion, and arranged to be at least partially received therein upon the selective closure of said first and said second leg members.

4. An adjustable clip as defined in claim 1 wherein said first leg member head portion upper portion further comprises means for releasing said tail member from locking engagement therewithin.

5. An adjustable clip as defined in claim 4 wherein said tail member engaging means in said first leg member head portion upper portion is a flexible tongue member attached to said head portion and having serrations thereon arranged to selectively interlock with said tail member serrations, the free end of said tongue member extending beyond the confines of said head portion to permit manual manipulation thereof.

6. An adjustable clip as defined in claim 1 wherein said tail member serrations extend along substantially the entire length of said tail member.

7. An adjustable clip as defined in claim 1 wherein said tail member is arcuately formed to subtend an arc coincident with the arc described by said tail member upon the selective closure of said first and said second leg members.

8. An adjustable clip as defined in claim 1 wherein said tail member further comprises a pair of opposed flanges bordering said serrations to provide at least a partial shield therefor, each of said flanges comprising an edge provided with teeth located generally adjacent the juncture between said tail member and said second leg member second end.

9. An adjustable clip as defined in claim 1 wherein said tail member engaging means in said first leg member head portion aperture upper portion is a flexible tongue member attached to said head portion and having serrations thereon arranged to selectively interlock with said tail member serrations, said head portion aperture lower portion being selectively proportioned to at least partially receive said second gusset portion therewithin.

10. An adjustable clip as defined in claim 9 wherein the free end of said tongue member extends beyond the confines of said head portion to permit the manual manipulation thereof.

* * * * *